United States Patent [19]

Peterson et al.

[11] Patent Number: 4,518,573

[45] Date of Patent: May 21, 1985

[54] DIFFERENTIAL FLOTATION REAGENT AND METHOD OF PREPARATION

[75] Inventors: John A. Peterson, Niagara Falls; Mohan S. Saran, Grand Island; Joseph S. Wisnouskas, Amherst, all of N.Y.

[73] Assignee: Occidental Chemical Corporation, Niagara Falls, N.Y.

[21] Appl. No.: 631,262

[22] Filed: Jul. 16, 1984

Related U.S. Application Data

[62] Division of Ser. No. 471,608, Mar. 3, 1983.

[51] Int. Cl.³ .......................... C01B 25/14; C22B 1/00

[52] U.S. Cl. .......................................... 423/303; 75/2

[58] Field of Search .............................. 423/303; 75/2

[56] References Cited

U.S. PATENT DOCUMENTS 3,369,875 2/1968 Woyski et al. .................. 423/303 X
3,834,894 9/1974 Spedden et al. .......................... 75/2
3,871,867 3/1975 Last et al. ................................ 75/2
3,928,019 12/1975 Marsh ...................................... 75/2

*Primary Examiner*—Donald R. Valentine
*Attorney, Agent, or Firm*—James F. Tao; William G. Gosz

[57] ABSTRACT

A dry differential flotation reagent for molybdenum-bearing ore is disclosed comprising from about 1 to about 30 percent by weight of NaSH, 0 to 20 percent by weight of NaOH, 60 to 90 percent by weight of a mixture of sodium thiophosphates comprising, as major components thereof, $Na_3PS_4$, $Na_3PS_3O$, $Na_3PS_2O_2$, and $Na_3PO_3S$, with $Na_3PS_4$ further comprising from about 15 mole percent to about 70 mole percent of the phosphate mixture. The flotation reagent can be prepared by reacting $P_4S_{10}$ with NaOH and NaSH in a molar ratio of about 1:16. When added to a flotation vessel containing molybdenum concentrate, the flotation reagent promotes suppression of lead and copper sulfides, even without the addition of sodium cyanide, to permit the improved recovery of molybdenum with a lower level of impurities.

10 Claims, No Drawings

DIFFERENTIAL FLOTATION REAGENT AND METHOD OF PREPARATION

This is a division of application Ser. No. 471,608 filed Mar. 3, 1983.

BACKGROUND OF THE INVENTION

Sulfidic ores, prevelant in the Western United States, contain amounts of copper, molybdenum, lead, iron and other elements and are mined for these metals. Separation or refining operations for type type of ore are commonly achieved by physically grinding or pulverizing the crude ore, followed by separation of copper, molybdenum and other metals through differential flotation methods. This invention applies to various chemical techniques used in differential flotation.

Through the use of differential flotation, sulfidic ores, which contain small amounts of copper sulfide and molybdenum disulfide, may be separated into fractions or concentrates which ultimately contain 90% or more copper sulfide by weight in a copper concentrate or up to 90% or more molybdenum disulfide ($MoS_2$) by weight in molybdenum concentrate. These methods of differential flotation separation are generally well known and are in widespread commercial use.

Various differential flotation techniques have been used to separate and concentrate minerals, and many chemical compositions have been employed for this purpose. In some froth flotation techniques, the concentrate of a preferred metal salt floats to the surface of a flotation vessel while the non-preferred salts are suppressed and discarded. Other techniques concentrate one preferred metal salt by flotation, while another preferred metal salt is suppressed and later recovered from the tailings. In primary copper recovery, for example, a molybdenum suppressant, such as dextrin, can be added to a flotation cell to cause the molybdenum to sink while allowing the copper to float. The tailings containing suppressed material can then be added to another flotation cell for flotation (and recovery) of molybdenum. In an alternate process, a copper suppressant, such as Nokes Reagent, or alternatively sodium hydrosulfide, can be added to the primary flotation cell and the tailings added to a secondary cell for recovery of copper. This invention is primarily concerned, however, with the first approach.

Since many minerals occur as sulfides in nature, methods for separating metal sulfides from their environment are well known. For instance, one commercial process grinds the molybdenum ore to a fine sand and disperses the ground ore in water. The ore slurry is then pumped to a flotation cell where it is mixed with a lightweight oil. Air bubbles passing through the flotation cell carry the molybdenum particles to the surface in the form of molybdenum concentrate which is collected for further processing.

Through the use of certain chemicals in the final stages of flotation processing, the physical properties of the metallic sulfides can be altered permitting fine particles of the selected metallic sulfide to be further concentrated in the processing foam, or to otherwise float and be removed, while other metallic sulfides are relatively unaffected and remain dispersed or suppressed in the aqueous phase. Inorganic chemicals which affect the physical properties of sulfidic ores in this way and allow their separation include aqueous solutions of phosphorus, sulfur, arsenic, and antimony compounds, to name but a few. Organic chemicals which are useful in sulfidic ore flotation include hydrocarbon oils, xanthates, alcohols, and silicones, as well as various surfactants and wetting agents. It is believed that chemicals which function to suppress flotation of metal salts, or metal sulfides in the case of sulfidic ores, do so by altering the surface characteristics of one or more of the metal salts (sulfides) so that they remain in suspension, while allowing a selected metal salt (sulfide) to float to the surface.

In the case of molybdenum, the most important domestic source of this mineral is molybdenite ore which contains molybdenum in the form of molybdenum disulfide ($MoS_2$), as well as sulfides of copper, lead, and iron. Suppression of lead sulfide (or copper sulfide) can be accomplished by the addition of a suppressant solution to the molybdenum concentrate, commonly known as Nokes Reagent, which is well known for this purpose. Typically, Nokes Reagent is prepared by reacting $P_4S_{10}$ in an aqueous solution of sodium hydroxide at a molar ratio of about 1:14, respectively.

See, for example, U.S. Pat. No. 2,492,936, issued Dec. 27, 1949, to Nokes et al., which describes the preparation of Nokes Reagent in wet or dry form, and its use as a depressant for the froth flotation of molybdenum. This patent discloses the preparation of a dry product by suitable means such as spray drying. Where economics are favorable, the dry product can be prepared at a central location and shipped to the mining site for convenient use. Various other flotation methods and chemicals are also described in U.S. Pat. No. 2,811,255, issued Oct. 29, 1957, to Nokes et al., U.S. Pat. No. 2,608,298, issued Aug. 26, 1952 to Arbiter et al., and U.S. Pat. No. 3,785,488, issued Jan. 15, 1974 to Werneke.

The preparation of such Nokes Reagent solutions at the mining or refining site is frequently associated with numerous problems and difficulties, such as the evolution of poisonous gases, e.g. hydrogen sulfide. In addition, mixtures of $P_4S_{10}$ and sodium hydroxide have been known to react with explosive violence if the reaction conditions are not properly or carefully controlled. Thus, safety in handling, storage and use as well as difficulty in preparation, continues to be a major problem of great concern throughout the industry, and is a major factor in the search for alternate technology.

The suppression of copper sulfide, and to some extent, iron sulfide, is generally accomplished by the addition of sodium cyanide to the molybdenum concentrate either concurrently with the Nokes Reagent or in a separate processing step. However, sodium cyanide is also hazardous to use and must be handled with extreme care. Further, the effluent resulting from the use of sodium cyanide in froth flotation is an environmental contaminate and government regulations require treating such effluents with an oxidizing agent, such as chlorine dioxide, which increases the cost of the flotation process.

Accordingly, it is an object of the present invention to provide a differential flotation reagent for molybdenum ore which is economical, convenient to use, and results in a cleaner flotation process due to the improved suppression of metallic impurities.

Another object of this invention is to provide a differential flotation reagent which will permit elimination of sodium cyanide in the flotation process without substantial loss of performance.

SUMMARY OF THE INVENTION

The differential flotation reagent of the present invention comprises from about 1 to about 30 percent by weight of NaSH from about 0 to about 20 percent by weight of NaOH, and from about 60 to about 90 percent by weight of a mixture of sodium thiophosphates, the primary thiophosphate components being selected from the group consisting of $Na_3PS_4$, $Na_3PS_3O$, $Na_3PS_2O_2$, and $Na_3PO_3S$. The $Na_3PS_4$ component additionally comprises at least about 15 mole percent to about 70 mole percent, and preferably from about 30 mole percent to about 70 mole percent, of the sodium thiophosphate mixture. Such compositions can be prepared by reacting $P_4S_{10}$ with a mixture of NaOH and NaSH in a molar ratio of $P_4S_{10}$:NaOH:NaSH of from 1:16:0 to 1:8:8 and at a temperature in the range of from about 50° C. to about 70° C. Excess water can be advantageously removed from the reaction mixture by flash-drying the product at a temperature in the range of from about 130° C. to about 170° C. to form a substantially dry product with a moisture content of less than about 5 weight percent.

When used in the froth flotation process for molybdenum recovery, the differential reagent of the present invention results in the improved suppression of lead sulfide, and also results in acceptable levels of copper sulfide suppression without the use of sodium cyanide in the flotation process.

DESCRIPTION OF THE PREFERRED EMBODIMENT

In accordance with the present invention, an improved differential flotation reagent for separation of molybdenum from molybdenum-bearing ore can be prepared by reacting $P_4S_{10}$ with an alkali mixture of NaOH and NaSH in a molar ratio of $P_4S_{10}$ to alkali of from about 1:15 to about 1:17, respectively, with the NaOH/NaSH mixture containing at least about 50 mole percent of NaOH. The reaction is advantageously carried out at a temperature in the range of from about 50° C. to about 70° C. and at about atmospheric pressure by the controlled addition of $P_4S_{10}$ to an aqueous solution of NaOH, or NaOH and NaSH, followed by the removal of excess water from the reaction mixture.

This procedure contrasts with the preparation of the standard Nokes Reagent which is typically prepared by reacting $P_4S_{10}$ with NaOH in a molar ratio of 1:14, respectively. The use of additional NaOH in the present invention yields a product which contains a higher content of sodium tetrathiophosphate ($Na_3PS_4$) in comparison to conventional Nokes Reagent. The substitution of NaSH in part for NaOH, again at the higher molar ratio, increases the sodium tetrathiophosphate content even more. For example, the reaction of $P_4S_{10}$ with NaOH in a molar ratio of about 1:16 produces a product which contains a mixture of phosphorus compounds such as $Na_3PS_4$, $Na_3PS_3O$, $Na_3PS_2O_2$, $Na_3PO_3S$, $Na_3PO_4$, $Na_2HPO_3$, and $Na_2HPO_2S$. The sodium tetrathiophosphate ($Na_3PS_4$) content of this mixture is about 15% on a molar basis. The partial substitution of NaSH for NaOH can further increase the level of sodium tetrathiophosphate to as much as 70 mole percent. This compares with a sodium tetrathiophosphate content of only about 8% for standard Nokes Reagent. While not wishing to be bound to any particular theory of operability, it is believed that this higher level of sodium tetrathiophosphate contributes to both (1) increase the suppression of lead sulfide and copper sulfide in the froth flotation process, producing a cleaner molybdenum concentrate, and (2) increase the suppression of copper sulfide without the use of sodium cyanide, permitting the elimination of sodium cyanide in the flotation process.

The preparation of sodium tetrathiophosphate has been previously demonstrated in the literature on an experimental basis. It is known that $P_4S_{10}$ and sodium sulfide hydrate can be reacted as follows:

$$6Na_2S.9H_2O+P_4S_{10}\rightarrow 4Na_3PS_4+9H_2O$$

After dissolving the reaction product in additional water and filtering off the insolubles, the filtrate is cooled to crystallize $Na_3PS_4.8H_2O$. This procedure is disclosed by E. Glatzel in Z. anorg. allg. Chem. 44, 65–78 (1905), which also discloses that the crystalline product hydrolyzes readily unless purified very carefully, and thus has a poor shelf life. This procedure would not appear to be readily adaptable for use in a production scale process. In addition, the use of sodium tetrathiophosphate as a differential flotation reagent is not disclosed.

The reaction of $P_4S_{10}$ with either NaOH or NaOH and NaSH according to the present invention is carried out in an aqueous medium. The water must be efficiently removed, since the sodium tetrathiophosphate can quickly hydrolyze to sodium orthophosphate and/or lower sodium thiophosphates under certain conditions. For instance, the retention of solution in the 100° C. to 125° C. range at atmospheric pressure, where water is only slowly removed from the slurry, could cause extensive hydrolysis within 2 or 3 hours.

The removal of part of the water from the reaction mixture can be conveniently accomplished by distillation, preferably under vacuum at a temperature in the range of from about 70° C. to about 90° C. and a pressure in the range of from about 50 mm to about 100 mm Hg to form a liquid slurry. Water remaining in the liquid slurry after distillation can then be dried using conventional techniques suitable for converting thick slurries to dry solids, such as by means of a vacuum tray drier under the conditions described above for distillation, or at above about 130° C. at atmospheric pressure, spray drying or drying in a fluidized bed, to form a free flowing solid having a moisture content of less than about 5% by weight, preferably less than 1%. The term "dry" as used in the specification and claims to describe the present differential flotation reagent refers to compositions having such a moisture content.

Alternately, the reaction product can be dried directly after preparation, with or without an intervening distillation step, by flash drying using, for instance, a heated drum operated at a temperature of from about 130° C. to about 170° C. and at about atmospheric pressure. A suitable piece of equipment for flash drying would be a more double drum dryer heated with 100 psig. steam having a 1–2 mm thick layer of product on the drum.

Although the present invention has been described above and in the examples in terms of various methods of preparation, the differential flotation reagent of this invention is not to be construed as being limited to any particular method or technique or preparation. As broadly conceived, the improved differential flotation reagent comprises from about 1 to about 30 percent by weight of NaSH, from about 0 to about 20 percent by weight of NaOH, and from about 60 to about 90 percent by weight of a mixture of sodium thiophosphates the primary components of which are selected from the group consisting of $Na_3PS_4$, $N_3PS_3O$, $Na_3PS_2O_2$, and $Na_3PO_3S$, the $Na_3PS_4$ component additionally comprising from about 15 mole percent to about 70 mole percent, and preferably from about 30 to about 70 mole percent, of the sodium thiophosphate mixture.

The dried differential flotation reagent, typically in the form of a flaked or powdered product, is particularly hydrophilic and must be shipped or stored in moisture proof containers to prevent hydrolysis. Other than this consideration, shipping and handling of the product is relatively safe and no unusual precautions are needed at the mining or refining site. Alternately, the differential flotation reagent can be prepared directly at the mining or refining site.

In commercial use, the flotation reagent, usually in the form of an aqueous solution, is added directly to a flotation vessel or cell containing the molybdenum concentrate which has been processed to remove coarser impurities. Typically, this concentrate will contain about 3 to 10% by weight of molybdenum as compared with 0.2% by weight of molybdenum contained in the primary ore. The flotation reagent is advantageously added to the vessel in an amount of from about 0.1 lbs. to about 1.0 lbs., and preferably from about 0.2 lbs. to about 0.5 lbs. ($P_4S_{10}$ equivalent) per ton of molybdenum concentrate. Such amounts are effective in suppressing the other metallic sulfides contained in the concentrate, particularly lead and copper sulfides, to produce a purified or clean concentrate containing about 90% by weight of molybdenum sulfide. The high degree of suppression of copper sulfide is surprising in view of the fact that the addition of sodium cyanide to the flotation vessel is not required. This results in a marked improvement in the economics of the flotation process since (1) the purchase of sodium cyanide is obviated, and (2) removal of cyanide from effluent streams is also obviated.

In another commercial use, the reagent is added to a concentrate where copper sulfide is the major component, where it acts to suppress the copper minerals while molybdenum sulfide byproduce is floated off and recovered. The addition rate would be higher in this case, i.e. 1 lbs. or more ($P_4S_{10}$ equivalent) per ton of concentrate.

The following examples are intended to further illustrate the various embodiments and advantages of the present invention without limiting it thereby.

Examples 1 and 2 are comparative examples illustrating the preparation of a conventional Nokes Reagent in wet and dry form, respectively.

EXAMPLE 1

60 Grams of $P_4S_{10}$ was dissolved in a solution of 75.6 grams of NaOH in 464 grams of water. The $P_4S_{10}$ was added over a one hour period, and the reaction mixture was vigorously stirred and maintained at a temperature between 60° and 70° C. The mole ratio of $P_4S_{10}$ to NaOH was 1:14. The final solution contained 10% (wt.) $P_4S_{10}$, where "% (wt.) $P_4S_{10}$" represents total phosphorus content calculated from $P_4S_{10}$ input and material balance data. The distribution of phosphorus compounds includes the following major components, the relative mole % being determined by nuclear magnetic resonance using a phosphorus-31 probe:

| COMPOUND | RELATIVE MOLE % |
|---|---|
| $Na_3PS_4$ | 8 |
| $Na_3POS_3$ | 51 |
| $Na_3PS_2O_2$ | 19 |
| $Na_3PO_3S$ | 4 |
| $Na_3PO_4$ | 1 |
| $Na_2HPO_3$ | 11 |
| Other | 6 |

EXAMPLE 2

1220 Grams of $P_4S_{10}$ was added over a 3-hour period to a solution of 1537 grams of NaOH in 2686 grams of water, the reaction mixture being maintained at a temperature between 70° C. and 75° C. The resulting solution, containing 23% (wt.) $P_4S_{10}$, was then stirred at the same temperature for one hour. Portions of this mixture were then dried using a double drum dryer to yield a flaked product. The 6×8 inch drums had a gap of 0.13 inches, were rotated at 9 rpm, and were internally heated with steam at 84 psig. The mole ratio of $P_4S_{10}$ and had a distribution of phosphorus compounds with the following major components:

| COMPOUND | RELATIVE MOLE % |
|---|---|
| $Na_3PS_4$ | 10 |
| $Na_3POS_3$ | 51 |
| $Na_3PS_2O_2$ | 17 |
| $Na_3PO_3S$ | 7 |
| $Na_3PO_4$ | 3 |
| $Na_2HPO_3$ | 12 |

Examples of 3-6 illustrate the preparation of the dry differential flotation reagent of the present invention having various relative proportions of sodium tetrathiophosphate ($Na_3PS_4$).

EXAMPLE 3

60 Grams of $P_4S_{10}$ was added over a 20-minute period to a solution of 86.4 grams of NaOH in 154 grams of water, and the solution was stirred for an additional 15 minutes. The mole ratio of $P_4S_{10}$ to NaOH was 1:16. The reaction mixture temperature was maintained at 60° to 70° C., and the final concentration was 21% (wt.) $P_4S_{10}$. The mixture was evaporated for one hour by vacuum distillation (93° C. and 300 mm. of Hg) to 25% (wt.) $P_4S_{10}$. Final drying as a thin layer was done by retention in a vacuum oven at 110° C. and 300 mm of Hg for two hours. The final dry product contained 40.6% (wt.) $P_4S_{10}$ and had the following composition:

71% (wt.) sodium thiophosphates
6% (wt.) sodium phosphates and phosphites
1% (wt.) NaSH
17% (wt.) NaOH
5% (wt.) $H_2O$ The distribution of phosphorous compounds, in terms of relative mole %, was as follows:

| COMPOUND | RELATIVE MOLE % |
|---|---|
| $Na_3PS_4$ | 15 |
| $Na_3POS_3$ | 48 |
| $Na_3PS_2O_2$ | 18 |
| $Na_3PO_3S$ | 7 |
| $Na_3PO_4$ | 2 |
| $Na_2HPO_3$ | 10 |

EXAMPLE 4

60 Grams of $P_4S_{10}$ was dissolved in a solution of 71.2 grams of flaked $Na_2S$ (60% dry basis) and 43.2 grams of NaOH in 90 grams of water, to form an initial mixture of 23% (wt.) $P_4S_{10}$. The mole ratio of $Na_2S$:-NaOH:$P_4S_{10}$ was 4:8:1, which is equivalent to a ratio of NaSH:NaOH:$P_4S_{10}$ of 4:12:1 after the mixed alkali was dissolved.* The reaction conditions were the same as in Example 3. The final dry product contained 41.5% (wt.) $P_4S_{10}$ and had a distribution of phosphorous compounds with the following major components:

| COMPOUND | RELATIVE MOLE % |
|---|---|
| $Na_3PS_4$ | 38 |
| $Na_3POS_3$ | 27 |
| $Na_3PS_2O_2$ | 13 |
| $Na_3PO_3S$ | 11 |
| $Na_3PO_4$ | 3 |
| $Na_2HPO_3$ | 5 |

*$Na_2S$ is converted to NaSH and NaOH upon reaction with water as follows:

$$Na_2S + H_2O \rightleftharpoons NaSH + NaOH$$

EXAMPLE 5

60 Grams of $P_4S_{10}$ was dissolved in a solution of 84.1 grams of flaked NaSH (72% dry basis) and 43.2 grams NaOH in 113 grams of water, to form a reaction mixture of 20% (wt.) $P_4S_{10}$. The mole ratio of NaSH-:NaOH:$P_4S_{10}$ was 8:8:1. The reaction conditions were the same as in Example 3. The final dry product contained 40.4% (wt.) $P_4S_{10}$ and had a distribution of phosphorous compounds with the following major components:

| COMPOUND | RELATIVE MOLE % |
|---|---|
| $Na_3PS_4$ | 66 |
| $Na_3POS_3$ | 18 |
| $Na_3PS_2O_2$ | 7 |
| $Na_3PO_3S$ | 5 |
| $Na_3PO_4$ | 2 |
| $Na_2HPO_3$ | 1 |

EXAMPLE 6

A jacketed 50-gallon reactor equipped with an agitator was charged with a mixed alkali solution of 174.2 lbs. of 50% (wt.) NaOH solution plus 305.2 lbs. of 40% (wt.) NaSH solution. The mixed alkali solution was heated to 50° c. During the addition of $P_4S_{10}$, the reactor was maintained at 70° C. After addition was complete, the reaction mixture was held at 70° C. for two hours with stirring to insure complete reaction of $P_4S_{10}$ with the alkali. The solution was then fed to the double drum dryer described in Example 2, the drum being heated internally with steam at 100 psig. (164° C.). The feed was 50% (wt.) solids (dry basis) fed at the rate of about 15 lbs/hour to yield about 7.5 lbs./hour of dry product. The product was a free flowing coarse solid having the following composition:

70% (wt.) sodium thiophosphates
25% (wt.) NaSH
3% (wt.) $Na_3PO_4$
1% (wt.) $Na_4P_2O_7$
1% (wt.) $H_2O$ The distribution of phosphorus compounds, in terms of relative mole %, was as follows:

| COMPOUND | RELATIVE MOLE % |
|---|---|
| $Na_3PS_4$ | 59 |
| $Na_3POS_3$ | 20 |
| $Na_3PS_2O_2$ | 8 |
| $Na_3PO_3S$ | 5 |
| $Na_3PO_4$ | 6 |
| $Na_2HPO_3$ | — |
| Other | 2 |

As shown in Examples 3–6, which illustrate various aspects of the present invention, the differential flotation reagent of this invention has a minimum sodium tetrathiophosphate content of about 15% (see Example 3), while the sodium tetrathiophosphate of the prior art Nokes Reagent is between 8% and 10%.

Example 7 illustrates the preparation of a rough molybdenum concentrate for testing differential flotation reagents in a simulated froth flotation process.

EXAMPLE 7

A slurry containing 20 Kg. of crude molybdenite ore was ground in a rod mill, then conditioned with agitation in a Denver D-1 flotation cell. During the agitation, lime, vapor oil as a collection, and Arctic Syntex as a detergent were added. A pine oil frother was added, and a concentrate containing molybdenum values was floated off upon sparging with air. This rougher concentrate was recovered by filtration, typically 280 grams dry weight. Typical analyses were as follows:

| | Crude Ore | Rougher Concentrate |
|---|---|---|
| % Mo | 0.2 | 11.0 |
| % Cu | 0.01 | 0.28 |
| % Pb | 0.005 | 0.1 |
| % Fe | 1.5 | 3.2 |

Metal values were present in the concentrate primarily in the form of sulfide minerals: molybdenite, chalcopyrite, pyrite and galena.

Examples 8–10 are comparative examples illustrate the use of conventional Nokes Reagent in a simulated froth flotation process to separate molybdenum values from copper, iron, and lead sulfides.

EXAMPLE 8

The rougher concentrate of Example 7 was reslurried in water and subjected to a re-grinding step. During this step, lime and vapor oil collector were added. Sufficient conventional differential flotation reagent of Example 1 was added to provide a weight ratio of 0.25 lbs. $P_4S_{10}$ (contained) per ton of rougher concentrate (dry basis). The slurry was then conditioned in the flotation cell with agitation, while lime was added to adjust the slurry to a pH of 9.0, and sodium cyanide was added to a weight ratio of 0.25 lbs. NaCN per ton of rougher concentrate. Air sparge was introduced, and the cleaner flotation step was allowed to continue for 4 minutes. The cleaner concentrate was recovered from the froth and the tailings were recovered, weighed and analyzed. The % recovery of molybdenum in the cleaner concentrate and the % of copper, lead and iron found in the tailings was calculated for the cleaner flotation step. The results were as follows:

| Metal | % Recovery |
|---|---|
| Mo | 96.9 (cleaner concentrate) |
| Cu | 63.6 (tailings) |
| Pb | 74.2 (tailings) |
| Fe | 79.4 (tailings) |

EXAMPLE 9

The procedure of Example 8 was repeated except that the differential flotation reagent of Example 2 was used in the cleaner concentration step. The results were as follows:

| Metal | % Recovery |
|---|---|
| Mo | 96.9 (cleaner concentrate) |
| Cu | 64.0 (tailings) |
| Pb | Not Determined (tailings) |
| Fe | Not Determined (tailings) |

EXAMPLE 10

The procedure of Example 8 was repeated except that no sodium cyanide was added in the cleaner conditioning step. The results were as follows:

| Metal | % Recovery |
|---|---|
| Mo | 96.8 (cleaner concentrate) |
| Cu | 36.9 (tailings) |
| Pb | 73.4 (tailings) |
| Fe | 74.2 (tailings) |

Examples 11–13 illustrate the use of the differential flotation reagent of the present invention in a simulated froth flotation process to separate molybdenum values from copper, iron, and lead sulfides.

EXAMPLE 11

The procedure of Example 8 was repeated except that the differential flotation reagent of Example 4 was used in the cleaner flotation step. The results were as follows:

| METAL | % RECOVERY |
|---|---|
| Mo | 97.4 (cleaner concentrate) |
| Cu | 73.3 (tailings) |
| Pb | 82.6 (tailings) |
| Fe | 76.5 (tailings) |

EXAMPLE 12

The procedure of Example 8 was repeated except that the differential flotation reagent of Example 5 was used in the cleaner flotation step. The results were as follows:

| METAL | % RECOVERY |
|---|---|
| Mo | 97.8 (cleaner concentrate) |
| Cu | 70.0 (tailings) |
| Pb | 82.6 (tailings) |
| Fe | 79.0 (tailings) |

EXAMPLE 13

The procedure of Example 12 was repeated except that no sodium cyanide was added in the cleaner conditioning step. The results were as follows:

| METAL | % RECOVERY |
|---|---|
| Mo | 96.3 (cleaner concentrate) |
| Cu | 56.9 (tailings) |
| Pb | 84.6 (tailings) |
| Fe | 81.5 (tailings) |

A comparison of the results of Examples 8 and 9 with the results of Examples 11 and 12 illustrates the improved suppression of copper and lead obtained using the differential flotation reagent of the present invention. A further comparison of Examples 10 and 13 illustrate the improved suppression of copper and lead obtained without the addition of sodium cyanide using the present differential flotation reagent.

While various embodiments and exemplifications of this invention have been shown and described in the specification, modifications and variations thereof will be readily appreciated by those skilled in the art. It is to be understood, therefore, that the appended claims are intended to cover all such modifications and variations which are considered to be within the scope and spirit of the present invention.

What is claimed is:

1. A method for preparing a dry differential flotation reagent for molybdenum-bearing ore comprising the steps of:

(a) reacting $P_4S_{10}$ with an alkali mixture of NaOH and NaSH in a molar ratio of $P_4S_{10}$ to alkali of from about 1:15 to about 1:17, said mixture containing at least about 50 mole percent of NaOH, and (b) drying the reaction mixture.

2. The method of claim 1 wherein the alkali mixture of NaOH and NaSH contains at least about 75 mole percent NaOH.

3. The method of claim 1 wherein the alkali mixture contains 100 mole percent NaOH.

4. The method of claim 1 wherein water is removed from the reaction mixture by distillation prior to drying.

5. The method of claim 4 wherein the evaporation is conducted at a temperature in the range of from about 70° C. to about 90° C. and a pressure in the range of from about 50 mm to about 100 mm Hg.

6. The method of claim 1 wherein the reaction is conducted at a temperature in the range of from about 50° C. to about 70° C.

7. The method of claim 1 wherein the reaction mixture is flash dried at a temperature in the range of from about 130° C. to about 170° C.

8. The method of claim 1 wherein said molar ratio is about 1:16.

9. A product prepared according to the method of claim 1.

10. A product prepared according to the method of claim 7.

* * * * *